(12) United States Patent
He et al.

(10) Patent No.: US 10,175,424 B2
(45) Date of Patent: Jan. 8, 2019

(54) MULTIPLE CHANNEL FIBER PIGTAILED ACOUSTO-OPTIC DEVICE AND THE METHOD OF MAKING THE SAME

(71) Applicant: Advanced Optowave Corporation, Ronkonkoma, NY (US)

(72) Inventors: Chun He, Fremont, CA (US); Xiaojie Zhao, Stony Brook, NY (US)

(73) Assignee: Advanced Optowave Corporation, Ronkokoma, NY (US)

( * ) Notice: Subject to any disclaimer, the term of this patent is extended or adjusted under 35 U.S.C. 154(b) by 0 days.

(21) Appl. No.: 14/999,588

(22) Filed: May 31, 2016

(65) Prior Publication Data

US 2017/0343737 A1    Nov. 30, 2017

(51) Int. Cl.
| | | |
|---|---|---|
| *G02B 6/28* | (2006.01) | |
| *G02B 6/32* | (2006.01) | |
| *G02F 1/11* | (2006.01) | |

(52) U.S. Cl.
CPC ............. *G02B 6/2848* (2013.01); *G02B 6/32* (2013.01); *G02F 1/11* (2013.01)

(58) Field of Classification Search
CPC ...... G02B 6/2848; G02B 6/32; G02B 6/3616; G02F 1/11
USPC .......................................................... 385/7
See application file for complete search history.

(56) References Cited

U.S. PATENT DOCUMENTS

| | | | | | |
|---|---|---|---|---|---|
| 3,944,948 | A | * | 3/1976 | Redman | G02F 2/002 359/285 |
| 4,451,151 | A | * | 5/1984 | Huignard | G01C 19/64 250/227.19 |
| 5,082,368 | A | * | 1/1992 | Fuchs | G01M 11/3109 356/73.1 |
| 5,359,451 | A | * | 10/1994 | Gelbart | G02F 1/11 359/285 |
| 6,168,319 | B1 | * | 1/2001 | Francis | G02B 6/2937 385/55 |
| 6,282,336 | B1 | * | 8/2001 | Riza | G02F 1/31 385/21 |
| 6,546,169 | B1 | * | 4/2003 | Lin | G02B 6/262 385/27 |

(Continued)

FOREIGN PATENT DOCUMENTS

JP       60-101518       *   6/1985   ............... G06F 1/11

OTHER PUBLICATIONS

Wikipedia article "Diffraction grating".*

*Primary Examiner* — Robert Tavlykaev
(74) *Attorney, Agent, or Firm* — Suganda Jutamulia

(57) ABSTRACT

A multiple channel fiber pigtailed acousto-optic (AO) device comprises: a first multiple fiber collimator pigtail comprising a plurality of input fibers, a second multiple fiber collimator pigtail comprising a plurality of output fibers, wherein each of the plurality of output fibers is a conjugate of each of the plurality of input fibers, respectively, and an acousto-optic modulator (AOM) disposed between the first multiple fiber collimator pigtail and the second multiple fiber collimator pigtail, wherein the input fibers form input ports providing input beams to the AOM and the output fibers form output ports receiving output beams from the AOM, wherein at least one output fiber of the plurality of output fibers is coupled to an input fiber of the plurality of input fibers.

16 Claims, 11 Drawing Sheets

(56) References Cited

U.S. PATENT DOCUMENTS

| | | | | |
|---|---|---|---|---|
| 6,563,845 B2* | 5/2003 | Kumkar | .................... | G02F 1/11 |
| | | | | 359/205.1 |
| 6,885,807 B2* | 4/2005 | Riza | ......................... | G02F 1/11 |
| | | | | 385/10 |
| 7,120,174 B2 | 10/2006 | MacCormack et al. | | |
| 7,133,182 B2* | 11/2006 | Johnson | ............. | B23K 26/0626 |
| | | | | 219/121.6 |
| 7,289,733 B1 | 10/2007 | He | | |
| 7,711,013 B2 | 5/2010 | Liu et al. | | |
| 2005/0276286 A1* | 12/2005 | MacCormack | ....... | H01S 3/0675 |
| | | | | 372/10 |
| 2013/0094796 A1* | 4/2013 | Namati | ................ | G02B 6/2861 |
| | | | | 385/1 |
| 2015/0083698 A1* | 3/2015 | Hua | .................... | H05K 3/0026 |
| | | | | 219/121.67 |

* cited by examiner

AOM

AOM

AOM

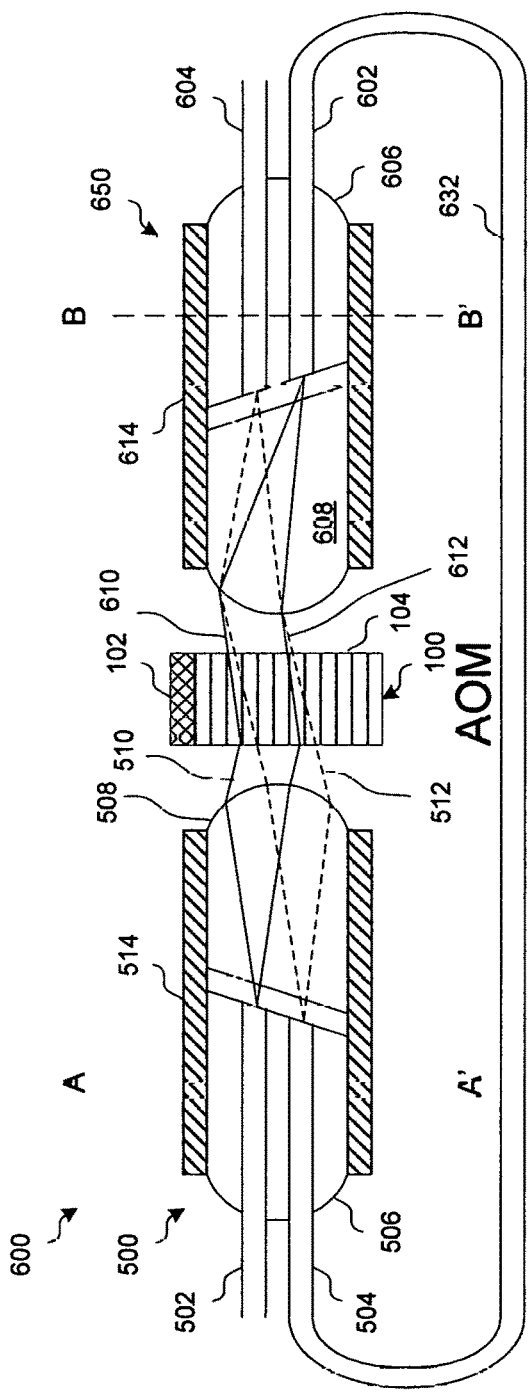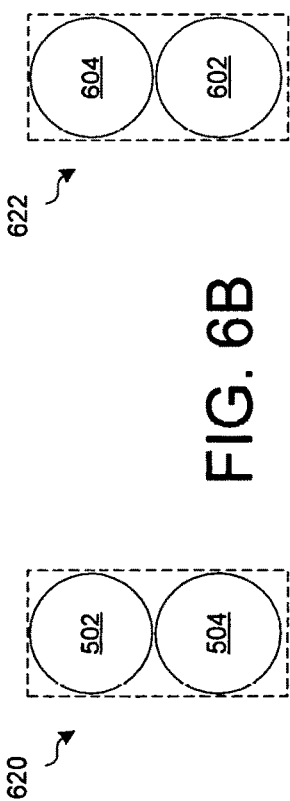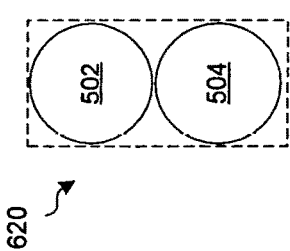
FIG. 6A
FIG. 6C
FIG. 6B

MULTIPLE CHANNEL FIBER PIGTAILED ACOUSTO-OPTIC DEVICE AND THE METHOD OF MAKING THE SAME

FIELD OF THE INVENTION

This invention relates to multiple channel fiber pigtailed acousto-optic devices and their making methods.

BACKGROUND OF THE INVENTION

Acousto-Optic Modulator (AOM) has been proven to be the device of choice for many applications in laser manufacturing because it allows high performance, high laser damage threshold, low drive voltage, and low cost.

AOMs are used in lasers for Q-switching, in telecommunications for signal modulation, and in spectroscopy for frequency control. A piezoelectric transducer is attached to an acousto-optic (AO) material such as glass, quartz, or other crystals. An oscillating electric signal drives the transducer to vibrate, which creates sound waves in the AO material. By vibrating the material with a pure sinusoid so that the light is diffracted into the first diffraction order, very high diffraction efficiency can be achieved.

The rise/fall time of the AOM is an important parameter of the AOM. The rise/fall time determines how fast an AOM can be operated in high frequency demanding applications, such as Q-switch, mode locking or pulse picking in a mode lock laser. The rise/fall time of an AOM is determined by acoustic traveling time through the laser beam. The rise/fall time of the commercial state-of-the-art AOM is typically 20-100 nanoseconds (ns).

The newly emerged mode locked solid state lasers and fiber lasers generate short pulse laser with 20-80 MHz repetition frequency. For active mode-locking and pulse picking for these 20-80 MHz repetition frequency lasers, the AOM needs to have rise/fall time less than 5-6 ns. The best commercially available AOMs cannot meet the requirement for 40-80 MHz high repetition frequency laser. Even though the commercially available highest speed AOM may be used for the mode-locked lasers with repetition frequency of 20-40 MHz, the AO material cost is very high and the diffraction efficiency is low due the short optical path in the AO crystal. Accordingly, an AOM or an AO device comprising an AOM that has shorter rise/fall time than that of conventional commercially available AOM but has the same cost as conventional commercially available AOM is demanded.

SUMMARY

A multiple channel fiber pigtailed acousto-optic (AO) device comprises: a first multiple fiber collimator pigtail comprising a plurality of input fibers, a second multiple fiber collimator pigtail comprising a plurality of output fibers, wherein each of the plurality of output fibers is a conjugate of each of the plurality of input fibers, respectively, and a single acousto-optic modulator (AOM) disposed between the first multiple fiber collimator pigtail and the second multiple fiber collimator pigtail, wherein the input fibers form input ports providing input beams to the AOM and the output fibers form output ports receiving output beams from the AOM, wherein at least one output fiber of the plurality of output fibers is coupled to an input fiber of the plurality of input fibers.

The multiple channel fiber pigtailed AO device provides shorter rise/fall time than that of a single AOM having no output coupled to the input and costs the same as the single AOM.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6A shows an exemplary embodiment of two channel fiber pigtailed AO device according to the present invention.

FIG. 6B shows schematically an arrangement of input fibers in a cross-section of a first dual fiber collimator pigtail.

FIG. 6C shows schematically an arrangement of output fibers in a cross-section of a second dual fiber collimator pigtail.

Figure 1A:
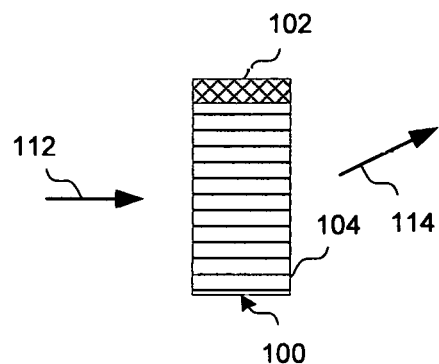
FIG. 1A shows an AOM with a pair of input-output beams.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Multiple channel fiber pigtailed acousto-optic (AO) devices are disclosed. The embodiments of the AO device comprise multiple input fibers and multiple output fibers forming the multiple input ports and multiple output ports of an AOM, respectively. The embodiments have the advantages of short rise/fall time, and easy use without the need for optical alignment, although a standard, conventional commercially available AOM is used in the embodiment.

FIG. 1A shows an AOM 100 comprising a transducer 102 and an AO material 104. Transducer 102 may be a piezoelectric transducer. AO material 104 may be glass, quartz, or other crystals or materials. An oscillating electric signal drives transducer 102 to vibrate, which generates sound waves in AO material 104. The sound waves modulate the refractive index of AO material 104 and make AOM 100 functioning like a thin or volume grating.

An input beam 112 is transmitted through AOM 100 and generates an output beam 114. Output beam 114 may be a first order diffraction beam of input beam 112, diffracted by the AOM 100. Input beam 112 and output beam 114 may be coherent light beams.

Figure 1B:
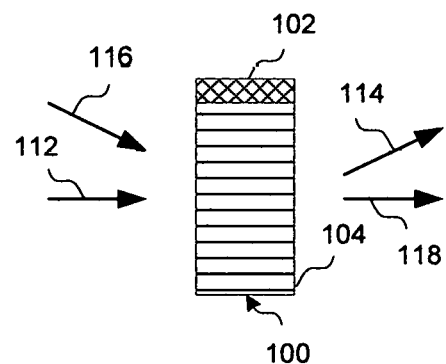
FIG. 1B shows an AOM with two pairs of input-output beams.

FIG. 1B shows two input beams 112 and 116. Input beam 112 generates an output beam 114 and input beam 116 generates an output beam 118. Since output beams 114 and 118 propagate in different and separate directions, they do not interact to each other. In other words, there is no interference effect between input beams 112 and 116 that can be observed in output beams 114 and 118.

Figure 1C:
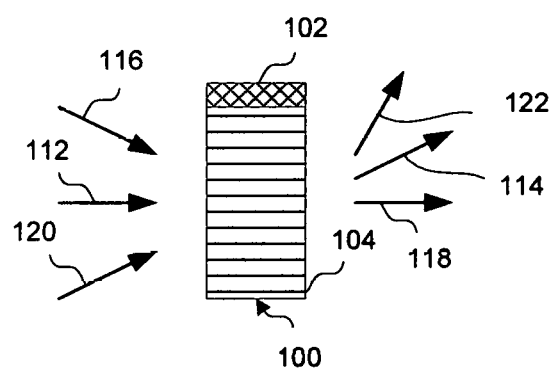
FIG. 1C shows an AOM with three pairs of input-output beams.

FIG. 1C shows three input beams 112, 116, and 120 generating output beams 114, 118, and 122, respectively. All input and output beams propagate in different and separate directions. There is no interaction or interference among three pairs of input-output beams.

Figure 2A:
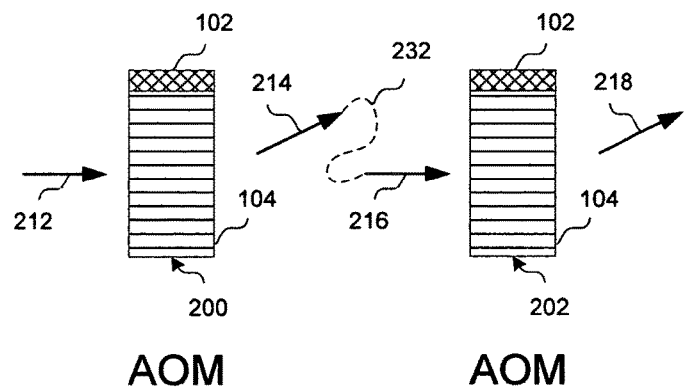
FIG. 2A shows an output beam of a first AOM coupled to an input beam of a second AOM.
Figure 3A:
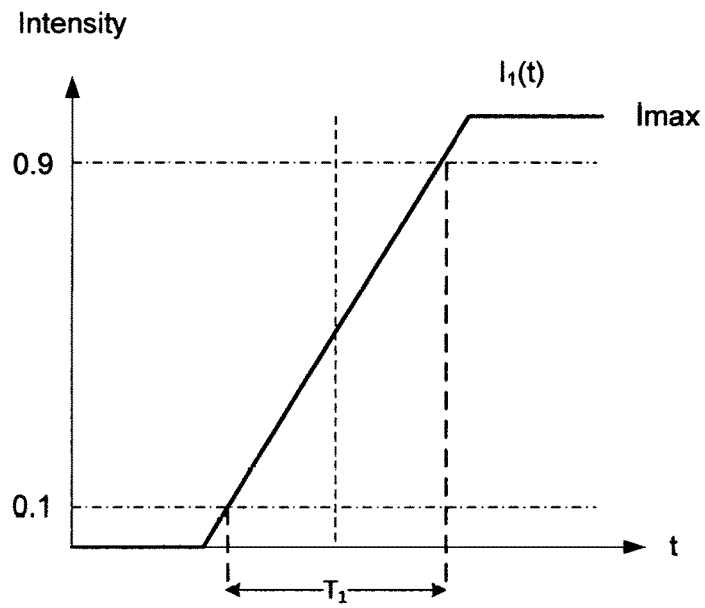
FIG. 3A shows schematically the intensity of an output beam of an AOM as a function of time.

FIG. 2A shows an input beam 212 is transmitted through a first AOM 200 generating an output beam 214. Before first AOM 200 is turned on, no output beam 214 is generated. $I_1(t)$, which is the intensity of output beam 214, is zero before first AOM 200 is turned on. After first AOM 200 is turned on, $I_1(t)$ gradually increases until it reaches its maximum value Imax. The time span from when $I_1(t)=10\%\times$Imax to when $I_1(t)=90\%\times$Imax is known as the rise time of the AOM. For example, a rise time for output beam 214 is $T_1$. FIG. 3A shows schematically the intensity of output beam 214 $I_1(t)$ as a function of time.

Fall time is the reverse process of rise time. Before the AOM is turned off, the intensity $I_1(t)$ equals to Imax. After the AOM is turned off, $I_1(t)$ gradually decreases until it reaches zero. The time span from when $I_1(t)=90\%\times$Imax to when $I_1(t)=10\%\times$Imax is known as the fall time of the AOM. Usually, the fall time is the same as the rise time. Accordingly, rise time is described in the disclosure, which may be applied to fall time as well. In many cases, although the fall time may not be identical to rise time, the fall time decreases as the rise time decreases.

FIG. 2A also shows first AOM 200 and a second AOM 202 are arranged in series. Input beam 212 is transmitted through first AOM 200 generating output beam 214. An input beam 216 is transmitted through second AOM 202 generating an output beam 218. Output beam 214 is coupled to input beam 216 by a coupling path 232. Coupling path 232 is sufficiently short that light travels almost instantly from output beam 214 to input beam 216. This is because the speed of light is approximately $3.00\times10^8$ m/s in air or vacuum and $2.00\times10^8$ m/s in glass. The rise times of first AOM 200 and second AOM 202 are approximately 20-100 ns. For example, in 20 ns light travels approximately 6 min air and 4 m in glass. Coupling path 232 is shorter than 6 m in air or 4 m in glass (optical fiber), preferably, coupling path 232 is less than 0.4 m if an optical fiber is used.

If first AOM 200 and second AOM 202 are turned on at the same time, the intensity of output beam 218 $I_2(t)$ will be approximately $I_1(t)\times I_1(t)$. When the intensity of output beam 218 is $\alpha\%$ of the intensity of input beam 216, the intensity of input beam 216, which is approximately the same as the intensity of output beam 214—since light travels from output beam 214 to input beam 216 almost instantly, is approximately $\alpha\%$ of the intensity of input beam 212. Thus, the intensity of output beam 218 will be approximately $\alpha\%\times\alpha\%$ of the intensity of input beam 212.

Figure 3B:
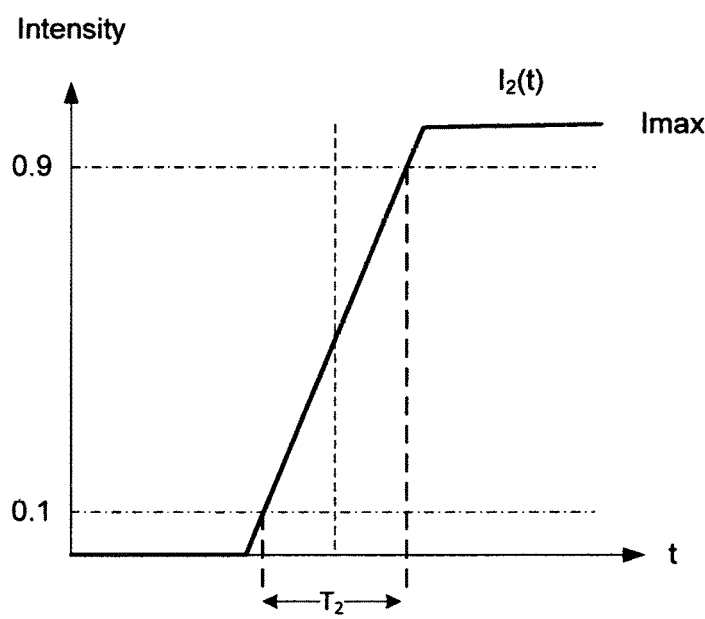
FIG. 3B shows schematically the intensity of the output beam of the second AOM of FIG. 2A as a function of time.

FIG. 3B shows schematically the intensity of output beam 218 $I_2(t)$ as a function of time. The rise time for output beam 218 is $T_2$, which is the time span from when $I_2(t)=10\%\times$Imax to when $I_2(t)=90\%\times$Imax. Since $I_2(t)=I_1(t)\times I_1(t)$, and $I_1(t)\le$Imax, one gets $T_2<T_1$.

Figure 2B:
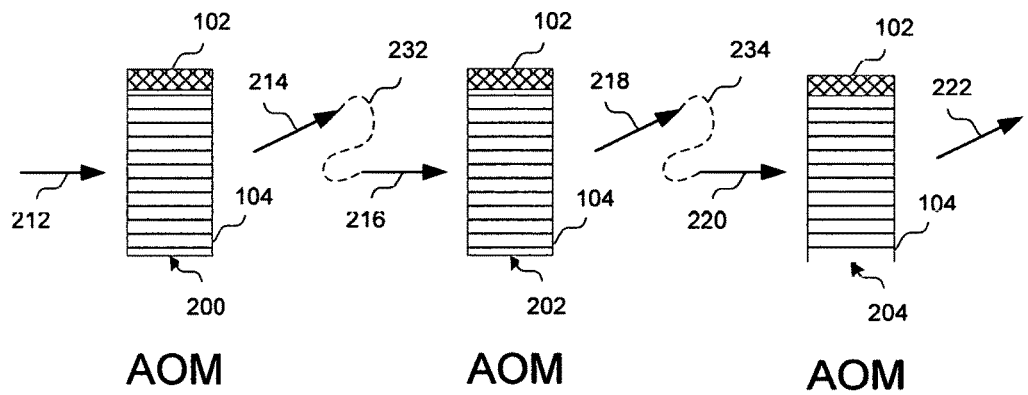
FIG. 2B shows an output beam of a first AOM coupled to an input beam of a second AOM and an output beam of the second AOM coupled to an input beam of a third AOM.

FIG. 2B shows first AOM 200, second AOM 202, and a third AOM 204 are arranged in series. Input beam 212 is transmitted through first AOM 200 generating output beam 214. Input beam 216 is transmitted through second AOM 202 generating output beam 218. An input beam 220 is transmitted through third AOM 204 generating an output beam 222. Output beam 214 is coupled to input beam 216 by coupling path 232. Output beam 218 is coupled to input beam 220 by a coupling path 234. Coupling paths 232 and 234 are sufficiently short that light travels almost instantly from output beam 214 to input beam 216 and from output beam 218 to input beam 220.

If first AOM 200, second AOM 202, and third AOM 204 are turned on at the same time, the intensity of output beam 222 $I_3(t)$ will be approximately $I_1(t)\times I_1(t)\times I_1(t)$. When the intensity of output beam 222 is $\alpha\%$ of the intensity of input beam 220, the intensity of input beam 220, which is approximately the same as the intensity of output beam 218—since light travels from output beam 218 to input beam 220 almost instantly, is approximately $\alpha\%$ of the intensity of input beam 216, and the intensity of input beam 216, which is approximately the same as the intensity of output beam 214—since light travels from output beam 214 to input beam 216 almost instantly, is approximately α% of the intensity of input beam 212. Thus, the intensity of output beam 220 will be approximately α%×α%×α% of the intensity of input beam 212.

Figure 3C:
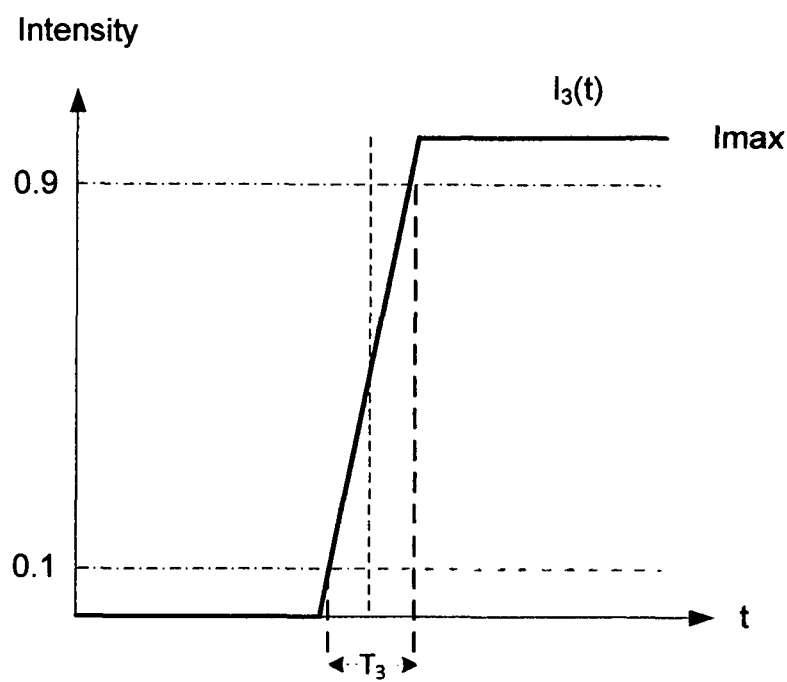
FIG. 3C shows schematically the intensity of the output beam of the third AOM of FIG. 2B as a function of time.

FIG. 3C shows schematically the intensity of output beam 222 $I_3(t)$ as a function of time. The rise time for output beam 222 is $T_3$, which is the time span from when $I_3(t)=10\%\times$Imax to when $I_3(t)=90\%\times$Imax. Since $I_3(t)=I_1(t)\times I_1(t)\times I_1(t)$, and $I_1(t)\leq$Imax, one gets $T_3<T_2<T_1$.

In this manner, by adding more AOMs in series, the rise time of output beam can be made shorter. It is appreciated that the use of any number of AOMs to reduce the rise time of output beam is possible. On the other hands, increasing the number of AOMs will increase the cost proportional to the number of AOMs.

Figure 4A:
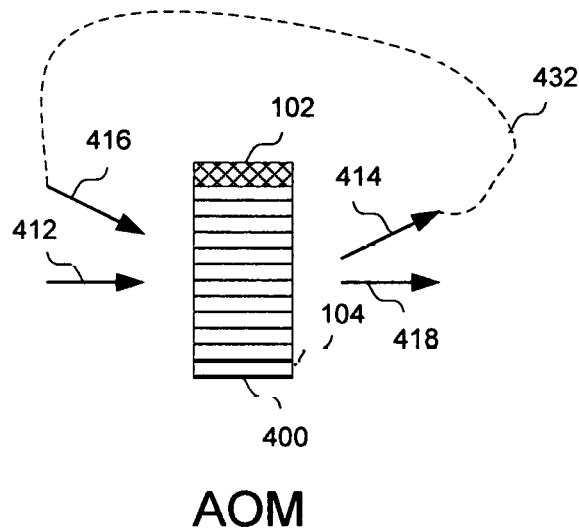
FIG. 4A shows an AOM with an output beam of a first pair of input-output beams coupled to an input beam of a second pair of input-output beams.

Referring to FIGS. 1A-1C and FIG. 2A, FIG. 4A shows that a single AOM 400 can function as first AOM 200 and second AOM 202 by coupling an output beam 414 to an input beam 416 using a coupling path 432. An input beam 412 generate output beam 414, and input beam 416 generates an output beam 418. Two pairs of input-output beams propagate in different and separate directions. For example, coupling path 432 may be an optical fiber. It is appreciated that coupling path 432 may be a waveguide in a substrate or other coupling paths. The rise time of output beam 418 is the same as $T_2$ depicted in FIG. 3B. $T_2$ is less than $T_1$, which is the rise time of the output beam when the light beam is transmitted through the AOM once. $T_1$ is normally considered the rise time of the AOM (FIG. 3A). FIG. 4A shows an example of two channel AO device, which has rise time $T_2$ less than rise time $T_1$ of the AOM.

To keep light traveling from output beam 414 to input beam 416 almost instantly, the optical fiber or the waveguide used for coupling path 432 should be sufficiently short, preferably less than 0.4 m.

Figure 4B:
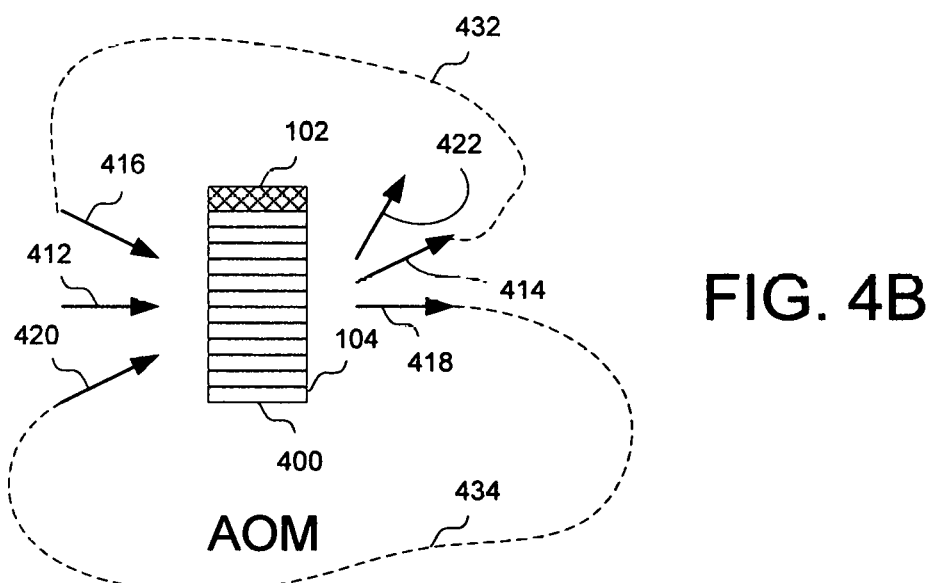
FIG. 4B shows an AOM with an output beam of a first pair of input-output beams coupled to an input beam of a second pair of input-output beams and an output beam of the second pair of input-output beams coupled to an input beam of a third pair of input-output beams

Referring to FIGS. 1A-1C and FIG. 2B, FIG. 4B shows that a single AOM 400 can function as first AOM 200, second AOM 202, and third AOM 204 by coupling output beam 414 to input beam 416 using coupling path 432, and output beam 418 to an input beam 420 using a coupling path 434. Input beam 412 generate output beam 414, input beam 416 generates output beam 418, and input beam 420 generates an output beam 422. Three pairs of input-output beams propagate in different and separate directions. For example, coupling paths 432 and 434 may be optical fibers or waveguides. The rise time of output beam 422 is the same as $T_3$ depicted in FIG. 3C. $T_3$ is less than $T_2$, $T_2$ is less than $T_1$, which is the rise time of the output beam when the light beam is transmitted through the AOM once. $T_1$ is normally considered the rise time of the AOM. FIG. 4B shows an example of three channel AO device, which has rise time $T_3$ less than rise time $T_2$ of two channel AO device. The optical fibers used for coupling path 432 and path 434 should be sufficiently short, preferably less than 0.4 m.

Figure 5A:
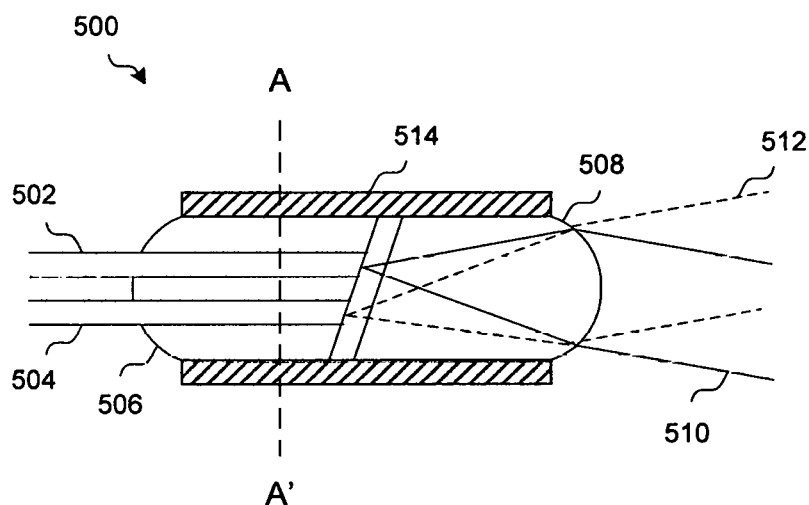
FIG. 5A shows schematically a dual fiber collimator pigtail.

FIG. 5A shows schematically a first dual fiber collimator pigtail 500 comprising first fiber 502 and second fiber 504 held by a first ferrule 506. Light coming out from first fiber 502 is collimated by a first lens 508 becoming first collimated light 510. Light coming out from second fiber 504 is collimated by first lens 508 becoming second collimated light 512. First ferrule 506 and first lens 508 are held by a first housing 514. First housing 514 may be a glass or metal tube or the like.

Figure 5B:
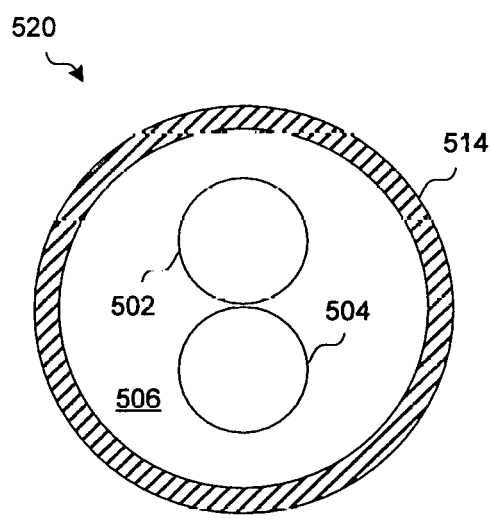
FIG. 5B shows schematically a cross-section of the dual fiber collimator pigtail.

FIG. 5B shows schematically a cross-section 520, which is a cross-section along line AA' of FIG. 5A. For example, first housing 514 may be a cylindrical tube. For example, first ferrule 506 may be a cylinder holding first fiber 502 and second fiber 504.

FIG. 6A shows an exemplary embodiment 600 of two channel fiber pigtailed AO device according to the present invention. Embodiment 600 comprises a first dual fiber collimator pigtail 500 (FIG. 5A), a second dual fiber collimator pigtail 650, and an AOM 100 disposed between first dual fiber collimator pigtail 500 and second dual fiber collimator pigtail 650. Second dual fiber collimator pigtail 650 comprising a third fiber 602 and a fourth fiber 604 held by a second ferrule 606. Second ferrule 606 and a second lens 608 are held by a second housing 614. Second housing 614 may be a glass or metal tube or the like. First fiber 502 and second fiber 504 are input fibers, third fiber 602 and fourth fiber 604 are out fibers.

It is appreciated that first dual fiber collimator pigtail 500 and second dual fiber collimator pigtail 650 may or may not be identical. Input and output fibers may or may not be identical. Input and output fibers may be polarization-maintaining (PM) fibers or non-PM fibers, single mode fibers or multimode fibers.

Third fiber 602 is a conjugate of first fiber 502. Fourth fiber 604 is a conjugate of second fiber 504. First fiber 502 and third fiber 602 form a first channel, and second fiber 504 and fourth fiber 604 form a second channel in the AO device 600 comprising only one AOM 100. The light in the first channel and second channel propagate in different and separate directions, they do not interact to each other. The channels in FIG. 6A are the same as the pairs of input-output beams in FIGS. 1A-1C, 2A-2B, and 4A-4B.

FIG. 6A shows first collimated light 510 and second collimated light 512 of first dual fiber collimator pigtail 500 transmit through AOM 100. First collimated light 510 is diffracted by AOM 100 becoming first diffracted collimated light 610. Second collimated light 512 is diffracted by AOM 100 becoming second diffracted collimated light 612. First diffracted collimated light 610 is focused by second lens 608 into third fiber 602. Second diffracted collimated light 612 is focused by second lens 608 into fourth fiber 604. Input fibers 502 and 504 form input ports providing input beams to AOM 100 and output fibers 602 and 604 form output ports receiving output beams from AOM 100.

It is appreciated that light coming out from input fibers 502 and 504 may be focused by first lens 508 on AOM 100. The focused beams on AOM 100 are diffracted by AOM 100. The diffracted beams are then focused by second lens 608 into output fibers 602 and 604, respectively. Alternatively or additionally, light coming from input fibers 502 and 504 may be diverging or converging and the diffracted beams are then focused by second lens 608 into output fibers 602 and 604, respectively.

FIG. 6B shows schematically an arrangement 620 of first fiber 502 and second fiber 504 in a cross-section along line AA' of first dual fiber collimator pigtail 500. FIG. 6C shows schematically an arrangement 622 of third fiber 602 and fourth fiber 604 in a cross-section along line BB' of second dual fiber collimator pigtail 650. The positions of first fiber 502 and third fiber 602 are reversed. The positions of second fiber 504 and fourth fiber 604 are reversed. Third fiber 602 is the conjugate of first fiber 502, fourth fiber 604 is the conjugate of second fiber 604.

FIG. 6A further shows that embodiment 600 comprises a fifth fiber 632 coupling third fiber 602 (output fiber) to second fiber 504 (input fiber) similar to FIG. 4A. Fifth fiber 632 is preferably shorter than 0.4 m. Fifth fiber 632 is a coupling fiber. In this manner, for a signal entering embodiment 600 from first fiber 502 and leaving embodiment 600 from fourth fiber 604, the rise time of output signal is the same as $T_2$ depicted in FIG. 3B. $T_2$ is less than $T_1$, which is the rise time of the signal when the light is transmitted through the AOM once. $T_1$ is normally considered the rise time of the AOM. It is appreciated that third fiber 602, fifth fiber 632, and second fiber 504 may be parts of a single fiber.

Referring to previous figures and discussion, it is appreciated that increasing the number of fibers in both first multiple fiber collimator pigtail and second multiple fiber collimator pigtail would further decrease the output signal rise time. Accordingly, a multiple channel fiber pigtailed AO device can be made to further shorten the rise time of the AO device.

Figure 7A:
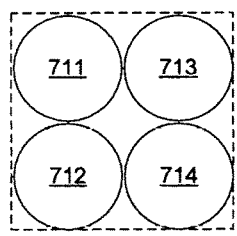
FIG. 7A shows schematically an arrangement of four input fibers in a cross-section of a first multiple fiber collimator pigtail.
Figure 7B:
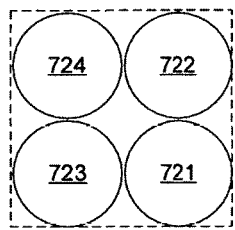
FIG. 7B shows schematically an arrangement of four output fibers in a cross-section of a second multiple fiber collimator pigtail.

FIG. 7A shows schematically an arrangement 700 of four input fibers 711, 712, 713, and 714 in a cross-section of a first multiple fiber collimator pigtail similar to the cross-section along line AA' of first dual fiber collimator pigtail 500. FIG. 7B shows schematically an arrangement 702 of four output fibers 721, 722, 723, and 724 in a cross-section of a second multiple fiber collimator pigtail similar to the cross-section along line BB' of second dual fiber collimator pigtail 650. Diffracted light from fiber 711 enters fiber 721, diffracted light from fiber 712 enters fiber 722, diffracted light from fiber 713 enters fiber 723, and diffracted light from fiber 714 enters fiber 724.

Fiber 721 is coupled to fiber 712, fiber 722 is coupled to fiber 713, and fiber 723 is coupled to fiber 714. In this manner, for a signal entering the embodiment from fiber 711 and leaving the embodiment from fiber 724, the rise time of output signal is less than $T_1$, which is the rise time of the signal when the light is transmitted through the AOM once. $T_1$ is normally considered the rise time of the AOM.

FIG. 7A and FIG. 7B show arrangement 700 of four input fibers and arrangement 702 of four output fibers of a four channel fiber pigtailed AO device. Output fibers 721, 722, 723, and 724 are conjugates of input fibers 711, 712, 713, and 714, respectively. Input fiber 711 and output fiber 721 form a first channel, input fiber 712 and output fiber 722 form a second channel, input fiber 713 and output fiber 723 form a third channel, input fiber 714 and output fiber 724 form a fourth channel.

Figure 8A:
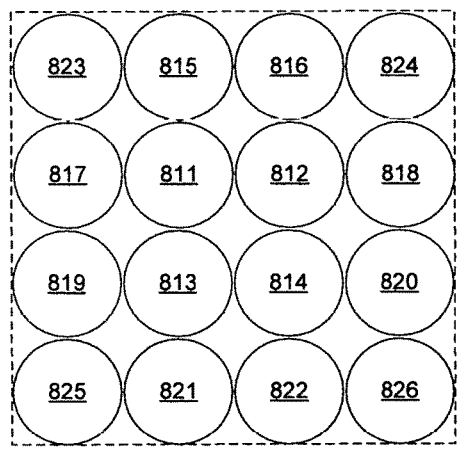
FIG. 8A shows schematically an arrangement of sixteen input fibers in a cross-section of a first multiple fiber collimator pigtail.
Figure 8B:
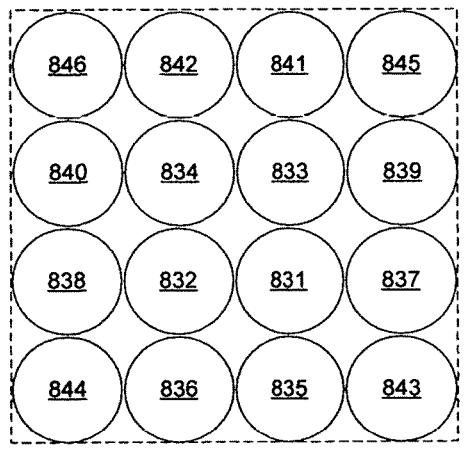
FIG. 8B shows schematically an arrangement of sixteen output fibers in a cross-section of a second multiple fiber collimator pigtail.

FIG. 8A shows schematically an arrangement 800 of sixteen fibers 811, 812, 813, . . . 826 in a cross-section of a first multiple fiber collimator pigtail similar to the cross-section along line AA' of first dual fiber collimator pigtail 500. FIG. 8B shows schematically an arrangement 802 of sixteen fibers 831, 832, 833, . . . 846 in a cross-section of a second multiple fiber collimator pigtail similar to the cross-section along line BB' of second dual fiber collimator pigtail 650. Diffracted light from fiber 811 enters fiber 831, diffracted light from fiber 812 enters fiber 832, diffracted light from fiber 813 enters fiber 833, . . . and diffracted light from fiber 826 enters fiber 846.

Fiber 831 is coupled to fiber 812, fiber 832 is coupled to fiber 813, . . . and fiber 835 is coupled to fiber 826. In this manner, for a signal entering the embodiment from fiber 811 and leaving the embodiment from fiber 846, the rise time of output signal is less than $T_1$, which is the rise time of the signal when the light is transmitted through the AOM once. $T_1$ is normally considered the rise time of the AOM.

FIG. 8A and FIG. 8B show arrangement 800 of sixteen input fibers and arrangement 802 of sixteen output fibers of a sixteen channel fiber pigtailed AO device. Output fibers 831, 832, 833, . . . 846 are conjugates of input fibers 811, 812, 813, . . . 826, respectively. Input fiber 811 and output fiber 831 form a first channel, input fiber 812 and output fiber 832 form a second channel, input fiber 813 and output fiber 833 form a third channel, and so on.

Figure 9:
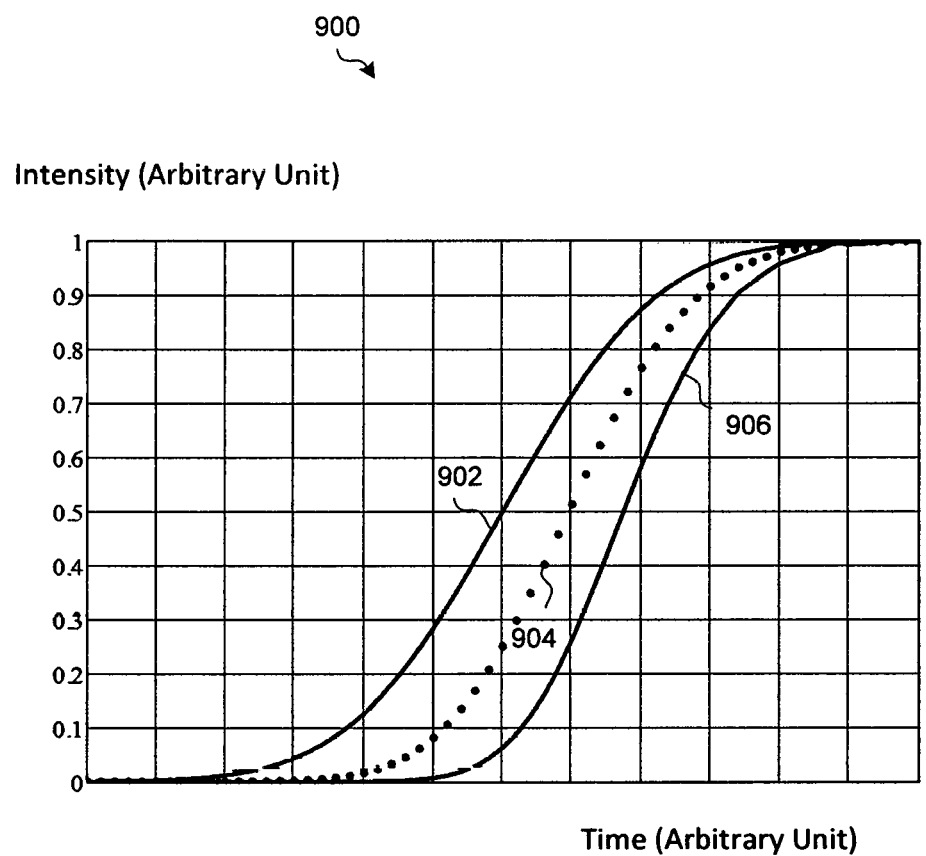
FIG. 9 shows intensities of output signals as functions of time in arbitrary units.

FIG. 9 shows a graph 900 of intensities of output signals as functions of time in arbitrary units. A curve 902 shows the intensity of output signal when the signal transmits through an AOM once having rise time $T_1$. For example, $T_1$ is the rise time associated with FIGS. 1A and 3A. A curve 904 shows the intensity of output signal when the signal transmits through the AOM twice having rise time $T_2$. For example, $T_2$ is the rise time associated with FIGS. 2A, 3B, 4A, and 6. A curve 906 shows the intensity of output signal when the signal transmits through the AOM fourth times having rise time $T_4$. For example, $T_4$ is the rise time associated with FIG. 7.

Rise time $T_1$ may be calculated as follows.

$$T_1 = \beta \times \frac{\phi}{V}, \tag{1}$$

where $\beta$ is a constant depending on laser beam profile and 0.66 in the case of a $TEM_{00}$ Gaussian mode beam, $\phi$ is the laser beam diameter at its waist, and V is the acoustic velocity of the AO material.

$$T_2 = T_1 \times T_1 \tag{2}$$

$$T_4 = T_1 \times T_1 \times T_1 \times T_1 \tag{3}$$

Figure 10:
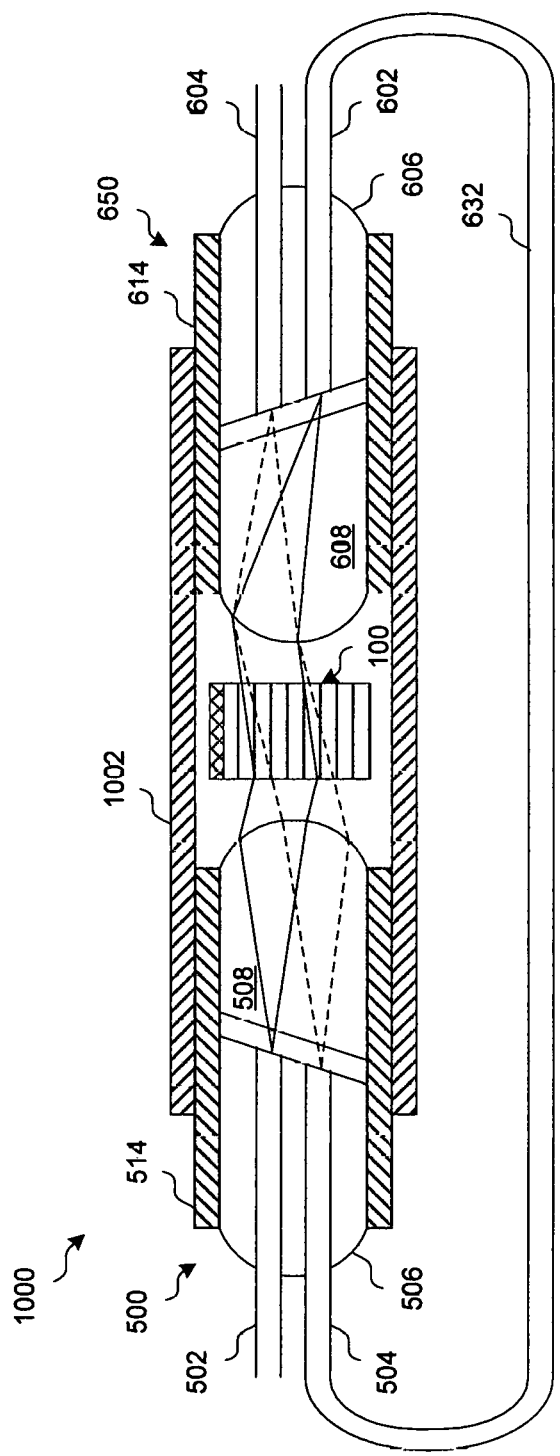
FIG. 10 shows an exemplary embodiment of two channel fiber pigtailed AO device according to the present invention.

From the calculation, where $\beta$ is 0.66 for a Gaussian beam, if beam diameter $\phi$ is 200 μm, and V is 5900 m/s for crystal quartz, one finds $T_1$ is 22.4 nanoseconds. $T_2$ is 80.7% of $T_1$ and is 18 nanoseconds and $T_4$ is 65.3% of $T_1$ and is 14.6 nanoseconds. It is appreciated that increasing the number of light passage through the AOM would further decrease the output signal rise time. For example, rise time $T_{16}$ associated with FIG. 8 would be less than rise time $T_4$ associated with FIG. 7, and so on FIG. 10 shows another exemplary embodiment 1000 of two channel fiber pigtailed AO device according to the present invention. Embodiment 1000 is similar to embodiment 600 of FIG. 6, except embodiment 1000 comprises a third housing 1002 enclosing first housing 514 of first dual fiber collimator pigtail 500 and second housing 614 of second dual fiber collimator pigtail 650.

Figure 11:
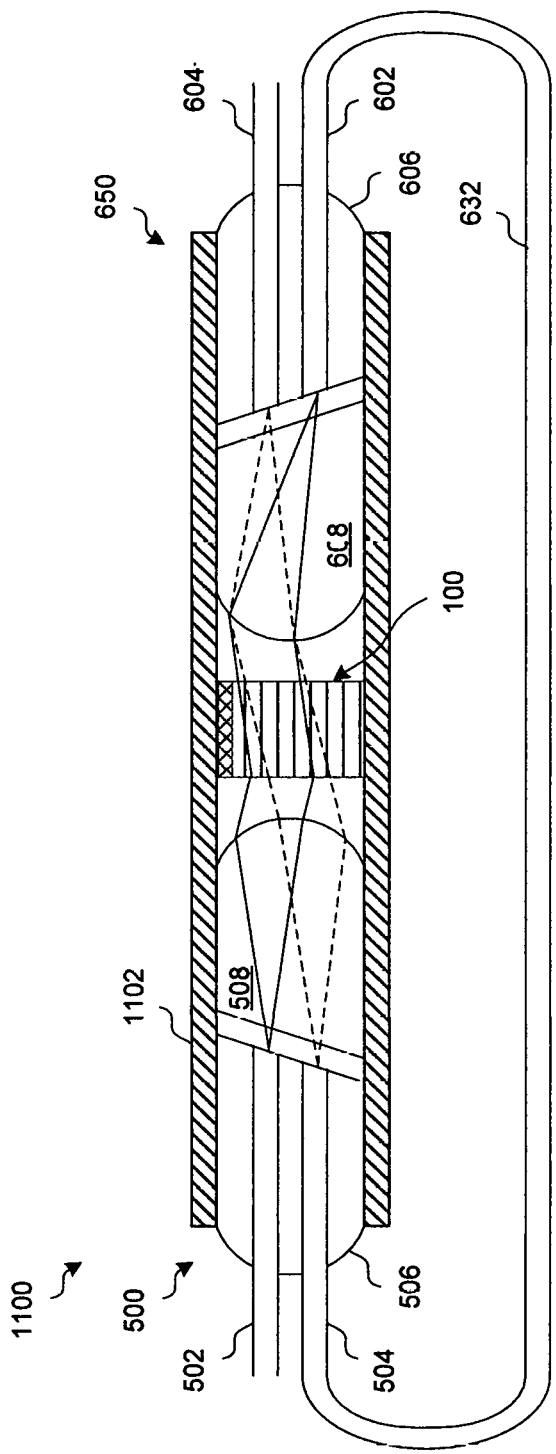
FIG. 11 shows an exemplary embodiment of two channel fiber pigtailed AO device according to the present invention.

FIG. 11 shows yet another exemplary embodiment 1100 of two channel fiber pigtailed AO device according to the present invention. Embodiment 1000 is similar to embodiment 1000 of FIG. 10, except embodiment 1100 does not use third housing 1002 enclosing first housing 514 of first dual fiber collimator pigtail 500 and second housing 614 of second dual fiber collimator pigtail 650. In embodiment 1100, first housing 514 and second housing 614 are integrated to be a single third housing 1102.

It is appreciated that embodiments 600 (FIG. 6A), 1000 (FIG. 10), and 1100 (FIG. 11) of two channel fiber pigtailed AO device can be applied to multiple channel fiber pigtailed AO device as well. Multiple fiber collimator pigtails may be used. For example, arrangements of input and output fibers for four channel fiber pigtailed AO device are depicted in FIGS. 7A and 7B, and arrangements of input and output fibers for sixteen channel fiber pigtailed AO device are depicted in FIGS. 8A and 8B.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially. For the disclosed apparatuses, the order of elements may be changed while the operation principle is the same.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An apparatus comprising:
   a first multiple fiber collimator pigtail comprising a plurality of input fibers;
   a second multiple fiber collimator pigtail comprising a plurality of output fibers, wherein the first multiple fiber collimator pigtail and the second multiple fiber collimator pigtail have a same number of fibers;
   an acousto-optic modulator (AOM) disposed between the first multiple fiber collimator pigtail and the second multiple fiber collimator pigtail, wherein the input fibers form input ports providing input beams to the AOM and the output fibers form output ports receiving output beams from the AOM, when the AOM is turned on, each fiber of the plurality of output fibers is a conjugate of a corresponding fiber of the plurality of input fibers, and an input beam provided by a fiber of the plurality of input fibers transmits through the AOM and is received by only one fiber of the plurality of output fibers, and when the AOM is turned off, the plurality of output fibers receive no input beam;
   wherein at least one output fiber of the plurality of output fibers is coupled to an input fiber of the plurality of input fibers; and
   wherein each output beam is a same first order diffraction beam of a corresponding input beam diffracted by the AOM.

2. The apparatus of claim 1, wherein the first multiple fiber collimator further comprises:
   a first ferrule for holding the plurality of input fibers;
   a first lens; and
   a first housing holding the first ferrule and the first lens.

3. The apparatus of claim 1, wherein the second multiple fiber collimator further comprises:
   a second ferrule for holding the plurality of output fibers;
   a second lens; and
   a second housing holding the second ferrule and the second lens.

4. The apparatus of claim 1, wherein the AOM comprises a transducer and an AO material, wherein the transducer generates sound waves in the AO material.

5. The apparatus of claim 1 further comprising a third housing enclosing a first housing and a second housing, wherein:
   the first multiple fiber collimator further comprises:
   a first ferrule for holding the plurality of input fibers;
   a first lens;
   the first housing holds the first ferrule and the first lens;
   the second multiple fiber collimator further comprises:
   a second ferrule for holding the plurality of output fibers;
   a second lens; and
   the second housing holds the second ferrule and the second lens.

6. The apparatus of claim 1 further comprising a housing, wherein:
   the first multiple fiber collimator further comprises:
   a first ferrule for holding the plurality of input fibers;
   a first lens;
   the second multiple fiber collimator further comprises:
   a second ferrule for holding the plurality of output fibers;
   a second lens; and
   the housing holds the first ferrule, the first lens, the second ferrule, and the second lens.

7. The apparatus of claim 1, wherein at least one output fiber of the plurality of output fibers is coupled to an input fiber of the plurality of input fibers using a coupling fiber.

8. The apparatus of claim 7, wherein the coupling fiber is shorter than 0.4 m.

9. A method comprising:
   providing a first multiple fiber collimator pigtail comprising a plurality of input fibers;
   providing a second multiple fiber collimator pigtail comprising a plurality of output fibers, wherein the first multiple fiber collimator pigtail and the second multiple fiber collimator pigtail have a same number of fibers;
   disposing an acousto-optic modulator (AOM) between the first multiple fiber collimator pigtail and the second multiple fiber collimator pigtail, wherein the input fibers form input ports providing input beams to the AOM and the output fibers form output ports receiving output beams from the AOM, when the AOM is turned on, each fiber of the plurality of output fibers is a conjugate of a corresponding fiber of the plurality of input fibers, and an input beam provided by a fiber of the plurality of input fibers transmits through the AOM and is received by only one fiber of the plurality of output fibers, and when the AOM is turned off, the plurality of output fibers receive no input beam;
   coupling at least one output fiber of the plurality of output fibers to an input fiber of the plurality of input fibers;
   wherein each output beam is a same first order diffraction beam of a corresponding input beam diffracted by the AOM.

10. The method of claim 9, wherein the first multiple fiber collimator further comprises:
    a first ferrule for holding the plurality of input fibers;
    a first lens; and
    a first housing holding the first ferrule and the first lens.

11. The method of claim 9, wherein the second multiple fiber collimator further comprises:
    a second ferrule for holding the plurality of output fibers;
    a second lens; and
    a second housing holding the second ferrule and the second lens.

12. The method of claim 9, wherein the AOM comprises a transducer and an AO material, wherein the transducer generates sound waves in the AO material.

13. The method of claim 9 further comprising providing a third housing to enclose a first housing and a second housing, wherein:
    the first multiple fiber collimator further comprises:
    a first ferrule for holding the plurality of input fibers;
    a first lens;
    the first housing holds the first ferrule and the first lens;
    the second multiple fiber collimator further comprises:
    a second ferrule for holding the plurality of output fibers;
    a second lens; and
    the second housing holds the second ferrule and the second lens.

14. The method of claim 9 further comprising providing a housing, wherein:
the first multiple fiber collimator further comprises:
a first ferrule for holding the plurality of input fibers;
a first lens;
the second multiple fiber collimator further comprises:
a second ferrule for holding the plurality of output fibers;
a second lens; and
the housing holds the first ferrule, the first lens, the second ferrule, and the second lens.

15. The method of claim 9, wherein coupling at least one output fiber of the plurality of output fibers to an input fiber of the plurality of input fibers is performed using a coupling fiber.

16. The apparatus of claim 15, wherein the coupling fiber is shorter than 0.4 m.

\* \* \* \* \*